United States Patent [19]

Suzuki

[11] Patent Number: 4,763,730

[45] Date of Patent: Aug. 16, 1988

[54] MISCIBLE GAS ENHANCED OIL RECOVERY METHOD USING OIL-BRINE COMPATIBLE PRE-FORMED FOAM

[75] Inventor: Shigeto Suzuki, San Francisco, Calif.

[73] Assignee: Chevron Research Company, San Francisco, Calif.

[21] Appl. No.: 81,976

[22] Filed: Aug. 5, 1987

Related U.S. Application Data

[63] Continuation-in-part of Ser. No. 895,664, Aug. 11, 1986, abandoned.

[51] Int. Cl.[4] ............................................. E21B 43/22
[52] U.S. Cl. ...................................... 166/273; 166/252; 166/274; 166/309; 252/8.554
[58] Field of Search ............... 166/252, 273, 274, 294, 166/309; 252/8.554

[56] References Cited

U.S. PATENT DOCUMENTS

| | | | |
|---|---|---|---|
| 3,342,256 | 9/1967 | Bernard et al. | 166/273 |
| 3,529,668 | 9/1970 | Bernard | 166/273 |
| 4,086,964 | 5/1978 | Dilgren et al. | 166/252 X |
| 4,393,937 | 7/1983 | Dilgren et al. | 166/272 |
| 4,495,995 | 1/1985 | Chen et al. | 166/273 |
| 4,572,294 | 2/1986 | Duerksen et al. | 166/273 |
| 4,576,232 | 3/1986 | Duerksen et al. | 166/273 X |
| 4,601,336 | 7/1986 | Dilgren et al. | 166/252 |

*Primary Examiner*—George A. Suchfield
*Attorney, Agent, or Firm*—Burns, Doane, Swecker & Mathis

[57] ABSTRACT

Oil recovery from a petroleum reservoir using a miscible gas, such as carbon dioxide, nitrogen or methane is enhanced by injecting a preformed stable foam into the reservoir. The foam composition is formed by an effective amount of an alpha olefin sulfonate (AOS) capable of forming a foam with water having a salt content similar to that in the reservoir and the miscible gas. Preferably, the alpha olefin sulfonates have from 8 to 24 carbon atoms. In a preferred form the AOS has on average a carbon content of less than about 12 carbon atoms in higher salt content brines and less than about 12 carbon atoms in lower salt content brines. Most preferably, in brines having a salt concentration of at least 10 weight percent, the AOS has on average about 10 carbon atoms; in brines having a salt concentration of from 2 to 10 weight percent the AOS has on average about 12 carbon atoms; and in brines having less than 2 weight percent salt and AOS has on average about 14 carbon atoms.

20 Claims, 2 Drawing Sheets

MISCIBLE GAS ENHANCED OIL RECOVERY METHOD USING OIL-BRINE COMPATIBLE PRE-FORMED FOAM

This is a continuation-in-part of Ser. No. 895,664, filed Aug. 11, 1986, now abandoned.

FIELD OF THE INVENTION

The present invention relates to enhanced oil recovery from a petroleum bearing formation. More particularly, it relates to enhancing production of oil from a producing formation wherein a non-condensible, miscible gas is used to improve the mobility of oil through the producing formation and a stable foam, compatible with the formation fluids including connate gas, oil and water or brine, is injected with the gas to direct gas pressure to the less permeable oil-rich portions of the formation.

It is a particular object of the present invention to provide a pre-formed foam that is compatible with the oil and brine content of petroleum-bearing formation into which a non-condensible miscible gas such as carbon-dioxide, nitrogen or methane, has been injected to assist oil displacement. Such gases reduce the viscosity of the native oil and re-pressure the formation to increase the flow of petroleum from at least one injection well to at least one producing well. These miscible gases are known to result in reduced viscosity of the petroleum by their mutual interaction, but, because of the inhomogeneity of most earth formations for each of the three phases, gas, oil and water, additional means are required to control the gas to avoid pressure loss to high permeability channels or "fingers" that form in the reservoir rock. Fingering of gas into relatively high permeability gas and water, or brine, channels interferes with the injection profile of the drive gas in the formation because substantially equal gas pressure is not available to move fluids through the low permeability oil-rich portions of the formation. Such pressure loss channels may also be generated by gravity effects of the low density gas which tends to cause the gas to rise to the top of the formation so that it overrides oil and water channels in the lower part of the formation.

To control such injection profiles, either due to fingering or gravity override, it has been proposed to use foam, in the same manner it is used to improve injection of steam to enhance oil recovery. However, in using a non-condensible, miscible gas, (rather than condensible steam), creation and maintenance of an effective foam in a three phase liquid system is difficult, particularly where the salt concentration of water in the formation (connate or injected) tends to break the foam or prevent it from forming initially. Accordingly, it is a particular object of the invention to provide a foam compatible with the formation oil and brine mixture which can be preformed before the foam is injected into the formation. Such foam is a mixture of the noncondensible gas, a brine comparable to that in the formation and an alpha olefin sulfonate (AOS) having from 8-24 carbon atoms, with the number of such carbon atoms being selected in accordance with the salt content of the brine. Contrary to prior known methods of forming a foam by using AOS as the foaming agent with water and gas and wherein higher molecular weight AOS has been used with higher salt concentrations in the brine, I have discovered that to form a stable foam in such brines, the carbon content of the AOS must be selected in accordance with an inverse relationship between salt content and AOS carbon content. Specifically, I have found that in brines having a higher salt concentration, desirably the AOS has on average less than about 12 carbon atoms. In brines having a lower salt concentration, desirably the AOS has on average at least about 12 carbon atoms. In a more preferred embodiment, the foam is preformed of a non-condensible gas, such as carbon dioxide, nitrogen or methane and mixtures thereof, and a brine similar to that in the producing formation and an effective foam forming amount of alpha olefin sulfonate. Desirably the alpha olefin sulfonates have a carbon content of from 10 to 16 carbon atoms. The foam in its most preferred form includes: in brines having a salt concentration of at least about 10 weight percent, the AOS has on average about 10 carbon atoms; in brines having a salt content of from about 2 to 10 weight percent, the AOS has on average about 12 carbon atoms; and in brines having a salt concentration of not more than about 2 weight percent, the AOS has on average about 14 carbon atoms.

In a preferred method of carrying out enhanced oil recovery using a preformed foam, a portion of noncondensible miscible gas is mixed with a brine having a salt content similar to that of the oil-bearing formation and an alpha olefin sulfonate selected in accordance with the invention. The fluids are injected into a well entering the formation and either preformed into a foam before introduction into the well or by adequate mixing of the constituents as the foam is pumped through the well and into the formation. The volume of the preformed foam is adequate to establish a stable bank of foam within the formation and particularly one which will enter the more permeable portions of the formation in sufficient quantity and with sufficient stability to maintain the foam when subsequently pressurized with the noncondensible miscible gas. The adequacy of the foam bank may be determined by production of oil through at least one producing well to which oil is driven by continued pressurization, so that reduced amounts of water and injection gas bypass oil rich portions of the formation before arriving at the producing well.

BACKGROUND OF THE INVENTION

It has been proposed heretofore to use a noncondensible miscible gas such as carbon dioxide, nitrogen, methane and the like for stimulating oil production from a petroleum-bearing formation. Such gas is injected into at least one well and petroleum is produced from at least one other well, penetrating the same formation. In general these gases have a relatively low critical point, that is the temperature above which the gas cannot be compressed to a liquid. Such gases are at least partially soluble in the oil. Because these gases, although noncondensible, are in fact soluble, or miscible in the oil, they are absorbed by the petroleum, either to reduce the viscosity of the oil or to increase its mobility through the formation, and at the same time the increased pressure of the gas drives residual petroleum in the formation to a producing well or wells.

As with all enhanced oil-recovery processes, the formation is quite non-uniform having been formed initially as a geological bed and then entrapping oil and gas (generally by displacing water) and gas therein over geological time. Because of the heterogeneity of the formation, primarily due to the inclusion of clays or shale material in the sedimentary beds, permeability to flow of liquids through the formation is quite variable throughout its structure. Further, the permeability of the formation to flow of each of the components, oil, gas and water frequently differs substantially in various parts of the formation. In general, the formation permeability is substantially greater for gas than for oil or water. As a result, the injection gas tends to "finger" through the reservoir formation, and primarily due to density differences through upper portions of the reservoir. This creates gravity separation, known as "gravity override" of the gas so that it tends to by-pass, or break through, the reservoir between injection and producing wells. Additionally, water may also create preferential flow-paths and similarly by-pass oil in less permeable portions of the earth formation. It is of course, most desirable that the injected gas act on the fluids of the formation as a piston-like displacement so that all fluids move at substantially the same rate through the formation. Thus, desirably the "injection profile" for the gas is made as nearly equal as possible at all points in the reservoir.

It has been proposed heretofore to use foam in the same manner as it has been used in steam-assisted oil recovery methods to equalize the injection profile across the formation. The injected foam tends to block more gas permeable portions of the formation so that the steam or gas pressure is diverted toward oil in the less permeable channels of the formation. However, a particular problem encountered in most earth formations is that the connate water is relatively saline, that is, the water or brine has a relatively high salt content as compared to fresh water. Furthermore, the brine content varies substantially between geological provinces (such as California vs. Gulf Coast, or mid-continent fields) as well as from field to field and from formation to formation. Depending upon the geological formation, the environment in which the oil was originally generated, or captured within rocks serving as a reservoir, the salt content of the brine may vary from 1% or less by weight to water substantially saturated with salt, e.g., in excess of 12% by weight. Such variations in salt content of formation waters may be due to either the oil having been generated or trapped in substantially fresh water, such as littoral beds in lakes, seas or rivers that are relatively salt-free. Higher salt content of the brine may be found where the oil is captured in reefs including salt beds or along the edges of salt domes, where over geological ages the water became saturated by solution of the salt.

Because of such wide variations in the salt content, it has been found difficult both to form and maintain a foam which will remain stable in the presence of such brines. Further, the oil content of the formation may also prevent the formation of the foam or rapidly break such a foam when formed by a common foaming agent, such as alpha olefin sulfonates, in brine or water and introduced into a producing formation using a noncondensible miscible gas drive.

As particularly distinguished from prior art methods, the present invention forms a stable foam of the noncondensible, miscible gas, such as the gas being used in an enhanced oil recovery process in a reservoir and one or more alpha olefin sulfonates which are effective to form a foam that is stable in contact with reservoir fluids, including petroleum and water comparable in salt content to water present in the reservoir.

SUMMARY OF THE INVENTION

In accordance with one aspect of the present invention there is provided a method of enhancing recovery of petroleum from an oil bearing formation during injection of a non-condensible gas having at least partial miscibility in the oil by at least periodically injecting a preformed foam composition into the reservoir. The foam is formed by an effective amount of alpha olefine sulfonates (AOS) and a brine similar to the reservoir water. The preformed foam is preferably a mixture of the non-condensible gas, brine and an alpha olefin sulfonate having from 8 to 24 carbon atoms. The number of carbon atoms of the AOS constituents are desirably selected in accordance with the salt content of the brine so that at higher salt concentrations the AOS has on average less than about 12 carbon atoms and at lower salt concentrations the AOS has on average at least about 12 carbon atoms. In a preferred form the non-condensible gas includes $CO_2$, $N_2$, $CH_4$ and mixtures thereof.

Most preferably, where the salt concentration of the brine is at least about 10 percent by weight, the AOS has on average about ten carbon atoms. Where the salt concentration of the brine is not greater than about two percent by weight, the AOS has about fourteen carbon atoms.

The effective amount of foam forming AOS required is determined by a combination of the concentration of AOS dissolved in the brine portion of the foam and the foam quality, that is, the relative proportions of liquid and gas in the foam. Preferably the liquid volume fraction of the preformed foam does not exceed about fifty percent; more preferably the liquid volume fraction is between five percent and fifty percent; and most preferably between about ten percent and thirty percent. The concentration of AOS in the brine can range from about 0.1 weight percent, which is just above the critical micelle concentration, to 1% or more, the upper limit usually being selected by cost constraint.

In accordance with another aspect of the present invention, it comprehends a method of enhancing oil recovery from an oil bearing formation wherein a miscible, non-condensible gas is injected to pressurize the formation fluids and/or increase the mobility of oil in the formation by preforming a stable foam from a portion of the miscible gas, a brine having a salt content substantially similar to water in the formation and an alpha olefin sulfonate compatible with said brine. The foam, stable in the presence of oil in the formation, is injected through at least one well bore penetrating the formation in sufficient volume to maintain a substantially continuous bank of the stable foam between the miscible gas and the permeability channels for gas, oil and water through said formation. Gas is then injected into said formation to drive said foam into said channels to enhance recovery of oil from the less permeable portions of said formation through at least one producing well penetrating the formation.

In a preferred form the alpha olefin sulfonate of the foam is selected to have from 8 to 24 carbon atoms so that such AOS is compatible with the salt content of the brine forming the foam. In a brine having a salt content in excess of about ten percent by weight, the alpha olefin sulfonate component has on average about 10 carbon atoms. In a brine having a salt content of not over two percent by weight, said alpha olefin sulfonate has on average about 14 carbon atoms.

Further in accordance with the method of the invention the alpha olefin sulfonate is selected to have on average about 12 carbon atoms in foam formed of brine having a salt concentration of from about two percent to ten percent by weight.

In accordance with the invention, alpha olefin sulfonates having either an odd or an even number of carbon atoms in the molecule may be used with equal effectiveness. As well understood in the art, alpha olefins may be produced either by the Ziegler process which generates even numbers of carbon atoms in the alpha olefin molecules or by steam cracking of wax which produces both odd and even numbers of carbon atoms in the molecule. The latter process is described in U.S. Pat. No. 3,488,384—Kessler et al. Accordingly, the number of carbon atoms in alpha olefin sulfonates "on average" as used in the practice of the method includes not only mixtures of molecules having an even number of carbon atoms, but also an odd number of carbon atoms.

Further objects and advantages of the present invention will become apparent from the following detailed description of the methods of the present invention set forth below, including the drawings and examples forming an integral part of the present application.

DESCRIPTION OF THE INVENTION

The present invention is, at least in part, based on the discovery that creation and maintenance of a foam in an earth formation containing waters of different salt content and oil composition require special tailoring of the surfactant material to prevent the salt content of the water or brine from interfering with foam generation or stability. Contrary to normal expectations as to activity of foaming agents, such as alpha olefin sulfonates, I have found that qualitatively the higher the salt content of the brine the lower the number of carbon atoms in such AOS that are required to make a stable foam that will persist in an environment of oil, gas and water within a formation. And such persistence is particularly useful in reservoirs undergoing assisted recovery using a miscible, non-condensible gas such as nitrogen, carbon dioxide or methane. Further the foam is desirably formed to a desirable liquid fraction or foam quality before it is injected into the formation with greater expectation that the foam will persist and thereby form a barrier particulary in the high permeability areas, such as those through which gas flows due to gravity override or fingering. Thus the injected gas will apply equal but higher pressure to the low permeability channels primarily in the lower part of the formation and richest in oil content. Increased oil production accordingly is obtained from a production well penetrating the same formation.

Figure 1:
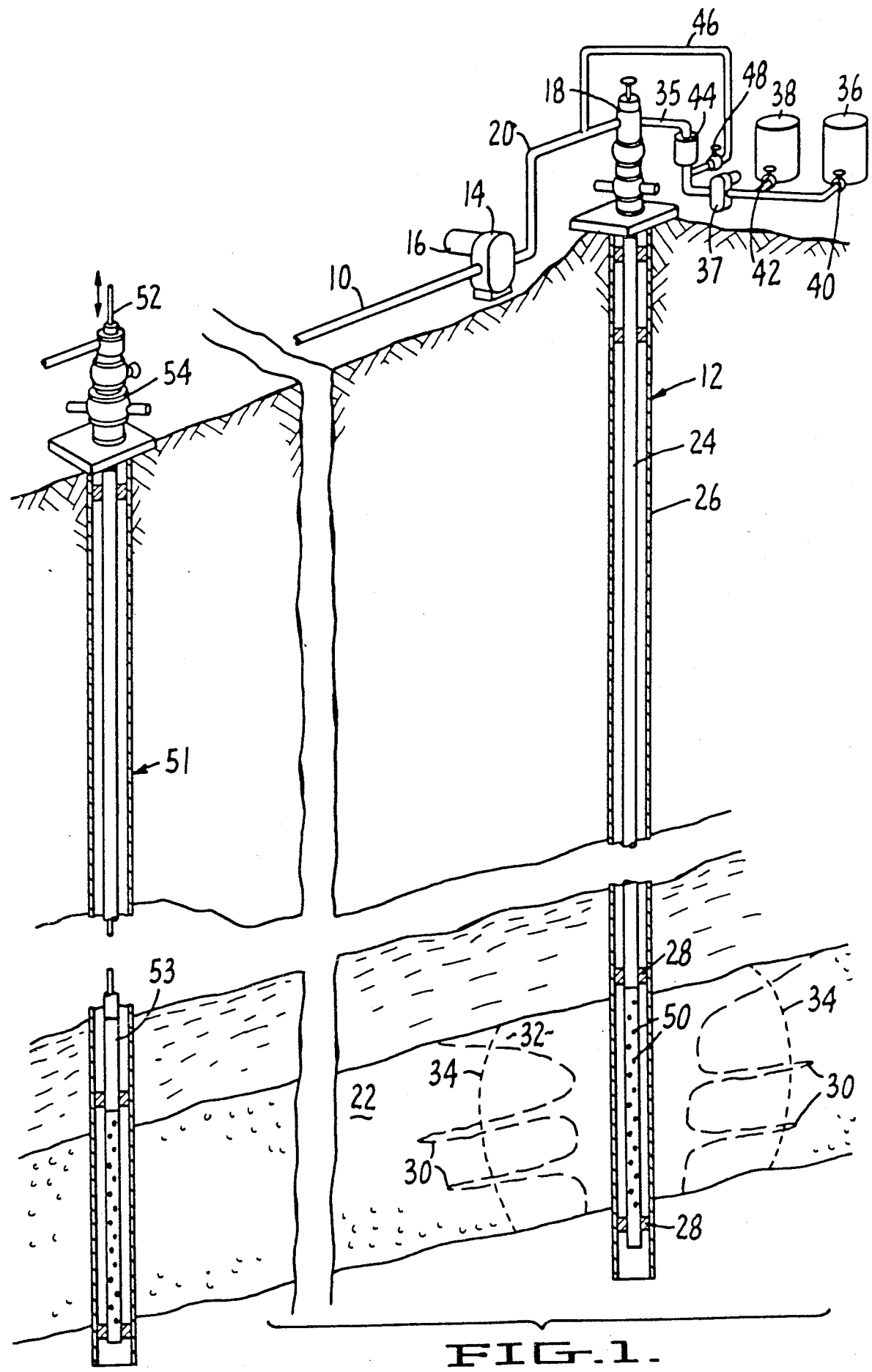
FIG. 1 is a schematic elevational view of an injection well penetrating a petroleum reservoir formed by a sedimentary formation. A miscible, non-condensible gas and a stable foam are injected through an injection well to increase the pressure on the connate fluids in low permeability portions of the formation to enhance recovery of oil from a producing well also penetrating the formation.

FIG. 1 illustrates schematically an arrangement for injecting the foam into an injection well and the formation. A source of gas under relatively high pressure is supplied to each injection well which in practice may either be a central well producing radially outwardly to a group of producing wells surrounding the injection well or the injection well may be one of several in a line capable of creating a "front" for driving oil through the formation to one or a line of producing wells. In FIG. 1 a single injection well and a single producing well are illustrative of the system. A source gas 10 supplies a miscible, non-condensible gas such as carbon dioxide, nitrogen, or methane through pipe line 10 to injection well 12. For illustrative purposes, a compressor 14 driven by motor 16 supplies the gas at a desirable pressure to well 12 through well head 18 and injection pipe 20. The gas is conducted to the desired earth formation 22 through an injection pipe string 24 within casing 26. Injection string 24 may be isolated within well bore 12 in casing 26 above and below formation 22 by packers 28.

As indicated before, the permeability of nearly all sedimentary earth formations which form petroleum reservoirs such as 22 are inherently inhomogeneous to flow of connate liquids, water, oil, and gas. Each of these fluids tend to flow selectively in permeability channels that have the least resistance to such flow. The resistance of flow of each primarily depends on viscosity either through or along with the other fluids. Typically, the resulting permeability for flow of each fluid is different in each formation. Since gases are more mobile than either oil or water, or their mixtures, injected gas in general tends to flow through more permeable gas channels or "fingers" 30 of formation 22 as indicated by dash lines. This gas flow by-passes "tighter" or less permeable zones wherein the oil-permeable passages are smaller or the oil is more tightly bound to the surface of the rock. In particular, the oil may also be in contact with clay or shale material with sand or carbonate components that form the permeable channels. Thus, "fingering" as indicated by channels 30, or "gas override" as indicated by area 32 at the top of formation 22, generally develops so that large portions of the liquid oil is not adequately pressured by the injected gas. As a result, gas flows predominantly through the lower resistance paths, gas channels 30 and 32. This distorts the desired injection profile for the gas as indicated generally by dotted line 34 to produce a piston-like movement of oil through the formation.

As indicated above, distortion of the injection profile may be corrected by addition of particular foam-forming components to the injected gas stream through injection line 35. For this purpose, surfactant and water brines are supplied by tanks 36 and 38 through valves 40 and 42, respectively by metering pump 37 to foam generator 44 and then to injection line 35. Foam may be supplied to the formation by forming it in generator 44 with gas before injection into well head 18. For this purpose a portion of such gas flow is from line 20 to generator 44 through line 46 under control of valve 48 to develop the desirable foam quality (gas/liquid ratio). Foam may also be formed in injection line 24 before contact with formation fluids, as by flow of surfactant solution and gas throughout perforations 50 and the lower end of tubing 24. Foam so generated upon injection preferentially flows with the gas to gas-permeable channels 30, 32. It effectively plugs them so that gas in the formation is then diverted to increase pressure on oil-rich portions of the formation. The desired result is indicated by the relatively piston-like movement of the miscible gas front indicated by dotted lines 34.

In the present illustration, oil is produced from an adjacent producing well, such as 51, by a pump 53 operating through sucker rods 52 through well head 54. The surfactant composition prepared in accordance with the present invention, is preferably supplied as a liquid solution so that it may be pumped from tanks 36 and 38, and metered by pump 37 through line 35 at a desired rate to contact gas flowing in well head 18 or injection string 24.

Test Apparatus

Figure 2:
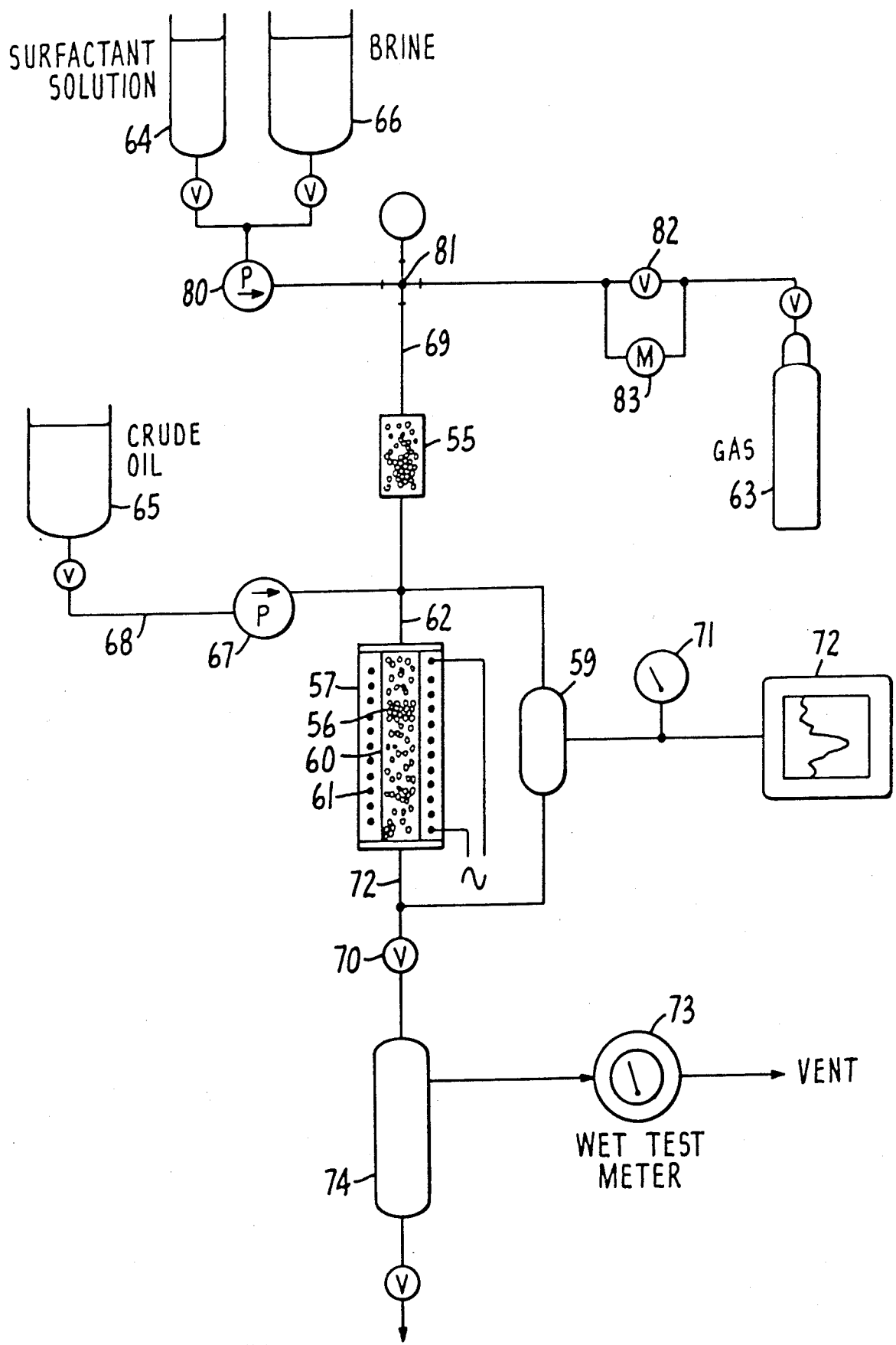
FIG. 2 is a schematic flow diagram of a test arrangement for generating foam in the presence of oil and water representative of connate fluids in a reservoir in which foam is formed for flow through a permeable core so that a surfactant forming such foam may be evaluated as to its usefulness to resist foam breaking by the connate oil and water to block gas permeable paths and thereby improve the gas injection profile on the formation fluids.

Referring now to FIG. 2, there is shown a test apparatus suitable for evaluating foam forming surfactant compositions in the presence of oil and brine having different percentages of salt content to simulate permeable oil-bearing reservoir rock being subjected to miscible gas injection. In the apparatus, the rock is simulated by a glass bead pack 60 of known permeability. Such a core is disposed in an autoclave or visual pressure container 57 suitable for holding the pack at reservoir temperatures and pressures. Heat may be added to the incoming fluids by electrical heater 61. Pressure is applied by gas source 63, such as nitrogen or carbon dioxide. Temperatures on the order of 70° F. to 500° F. and at pressures of up to 10,000 psi are respectively simulated by heater 61 and gas pressure source 63. Fluids selectively flow through cylinder 60 under suitable flow conditions. The flow arrangement includes inlet and outlet means, pipes 62 and 72, for passing fluids including (a) aqueous liquids, (b) oil and (c) a noncondensible gas. Differential pressure cell 59 provides means for measuring the pressure drop across the cylinder 60 during the testing process. In one embodiment, the main bed 56 of cylinder 60 was a hollow cylinder, six inches long, packed with 70-100 mesh (250-180 micron) glass beads. It was preceded by and connected to a three inch long cylinder 55 packed with the same glass beads which function as a foam generator. High pressure liquid metering pump 67 was attached to line 68 from oil-containing vessel 65 and fed into the line 62 between foam generator 55 and main bed 56. Outlet line 72 from main bed 56 passes through a back pressure regulator 70 and into a liquid separator vessel 74. Gas from vessel 74 passes through wet test meter 73 where its volume is measured at standard temperature and pressure. A pressure measuring device such as recorder 72 records differential pressure measured by (DP) cell 59 and indicated by meter 71. Cell 59 measures the pressure difference between inlet and outlet lines 62 and 72, respectively, to main bed 56.

A second high pressure liquid metering pump 80 was attached to surfactant solution vessel 64 and brine vessel 66 to form an aqueous surfactant solution. Tank 66 may be filled with a water solution including salt to simulate oil field brines of different concentrations. The outlet of pump 80 is fed into a T-joint 81 where it mixes with a noncondensible gas from tank 63 through pressure let down valve 82 and through gas flow measuring device 83. The combined liquid surfactant and noncondensible gas passes through line 69 into the entrance of foam generator cylinder 55. All connecting lines in the above apparatus were ¼ inches in outside diameter.

Test Procedure

The following experiments demonstrate the efficiency of the foam compositions of the present invention to improve miscible gas enhanced oil recovery. They were carried out as follows:

Oil storage vessel 65 was charged with the test oil. The surfactant storage vessel 64 was charged with an aqueous solution of the test surfactant. The aqueous solution also contained brine bearing a salt content under consideration, supplied from tank 66. Tank 63 containing the noncondensible gas of the experiment was attached to pressure-let-down valve 82 and test bed 56. The apparatus was heated to the desired temperature. Noncondensible gas was then passed through foam cylinder 55 and main test bed 56 to establish a desired back pressure as measured by DP cell 59. Then the surfactant solution was pumped into the system at a rate calculated to give the desired ratio of gas to liquid (foam quality). This mixture was passed through foam generator 55 and the resulting foam was passed into the main bed 56. The pressure developed by passing this foam through the glass bead packed bed was detected by pressure cell 59, and measured and recorded by recorder 71. After passing through back pressure valve 70, the foam was collected in liquid separator vessel 74 wherein the foam broke and the gaseous portion passed out through wet test meter 73. Measurement of temperature, total pressure, gas flow rate, surfactant flow rate, pressure drop, and outlet gas volume were taken. Next, oil metering pump 67 was started, and oil was pumped into the foam line 62 at a predetermined rate. Again, the same measurements were made and in addition, the oil flow rate was measured. The value of the differential pressure with foam only flowing through the test bed and then oil flowing through the foam is given as the ratio $R_2$ which is calculated as an indication of the foam susceptibility to breakdown when exposed to oil flow. $R_2$ is calculated as follows:

$$R_2 = \frac{\Delta P \text{ FOAM}}{\Delta P \text{ OIL}}$$

Wherein P FOAM is the differential pressure with foam formed of surfactant and brine flowing through the bed.

P OIL is the differential pressure of oil and foam flowing through the bed.

EXAMPLES

Following are tables of values which were obtained with the foregoing apparatus and test method. Brines and oils from three different oil fields were run wherein the salt content of the brine was respectively 15 weight percent, 3 weight percent and 5 weight percent and the alpha olefin sulfonate used as the foaming agent with those brines included varying numbers of carbon atoms. As demonstrated, the nearer the value of $R_2$ to 1.0, the more resistant the foam is to breaking due to oil flow therethrough. Conversely, the higher the value of $R_2$, the less resistant the foam is to being broken by oil flow. The more stable the foam is against being so broken by such flow, the more resistant foam in the reservoir is to breaking during flow through the reservoir connate water and oil. For measurements made in accordance with the foregoing procedure to be most meaningful, desirably the differential pressure measured in the absence of oil flow, must be greater than 20 psi at a pumping rate of about 250 ml/min.

TABLE I

HIGH BRINE (15%)

| Run No. | AOS Surfactant Carbon No. | Conc. wt % | Feed Rate, ml/min. Surfac. | Oil[1] | Gas[2] | Foam Quality | $\Delta p^3$, psi | $R_2$ calc |
|---|---|---|---|---|---|---|---|---|
| 1 | $C_{10}$ | 0.5 | 1.6 | 0 | 260 | 89 | 109.8 | — |
|  |  |  | 1.6 | 0.53 | 260 | 89 | 98.0 | 1.12 |
| 2 | $C_{10}$ | 0.5 | 1.5 | 0 | 208 | 87 | 81 | — |
|  |  |  | 1.5 | 0.5 | 208 | 87 | 70 | 1.16 |
| 3 | $C_{12}$ | 0.5 | 1.5 | 0 | 208 | 87 | 83 | — |
|  |  |  | 1.5 | 0.5 | 208 | 87 | 43 | 1.93 |
| 4 | $C_{10}/C_{12} = 1/1$ | 0.5 | 1.6 | 0 | 260 | 88 | 100.9 | — |
|  |  |  | 1.6 | 0.53 | 260 | 88 | 70.6 | 1.43 |
| 5 | $C_8/C_{10} = 1/1$ | 0.5 | 1.6 | 0 | 260 | 89 | 111.8 | — |
|  |  |  | 1.6 | 0.53 | 260 | 89 | 66.9 | 1.67 |
| 6 | $C_{10}/C_{12}/C_{14} = 1/1/1$ | 0.5 | 1.6 | 0 | 260 | 89 | 116.8 | — |
|  |  |  | 1.6 | 0.53 | 260 | 89 | 80.0 | 1.46 |
| 7 | $C_{10}/C_{12}/C_{14} = 1/3/1$ | 0.5 | 1.5 | 0 | 208 | 87 | 84 | — |
|  |  |  | 1.5 | 0.5 | 208 | 87 | 50 | 1.68 |

[1] The crude oil for these runs came from the Sacroc Oil Field, Scurry County, Texas
[2] Gas was $CO_2$, rate was measured at 70° F., 1 atmosphere.
[3] Outlet pressure 250 psig.

TABLE II

LOW BRINE (3%)

| Run No. | AOS Surfactant Carbon No. | Conc. wt % | Feed Rate, ml/min. Surfac. | Oil[1] | Gas[2] | Foam Quality | $\Delta P^3$, psi | $R_2$ calc |
|---|---|---|---|---|---|---|---|---|
| 1 | $C_{10}$ | 0.5 | 1.6 | 0 | 158 | 83 | 90.7 | — |
|  |  |  | 1.6 | 0.13 | 158 | 83 | 36.0 | 2.52 |
| 2 | $C_{12}$ | 0.5 | 1.6 | 0 | 142 | 81 | 86.4 | — |
|  |  |  | 1.6 | 0.13 | 142 | 81 | 76.0 | 1.14 |
| 3 | $C_{14}$ | 0.5 | 1.6 | 0 | 175 | 84 | 86.4 | — |
|  |  |  | 1.6 | 0.13 | 175 | 84 | 80.0 | 1.08 |
| 4 | $C_{16}$ | 0.5 | 1.6 | 0 | 153 | 82 | 87.6 | — |
|  |  |  | 1.6 | 0.13 | 153 | 82 | 78.4 | 1.12 |
| 5 | $C_{12}/C_{14}/C_{16} = 1/1/1$ | 0.5 | 1.6 | 0 | 143 | 81 | 90.0 | — |
|  |  |  | 1.6 | 0.13 | 143 | 81 | 86.4 | 1.04 |
| 6 | $C_{10}/C_{12} = 1/1$ | 0.5 | 1.6 | 0 | 158 | 83 | 87.6 | — |
|  |  |  | 1.6 | 0.13 | 158 | 83 | 69.5 | 1.26 |

[1] The crude oil for these runs came from the Huntington Beach field, Orange County, California.
[2] The gas was $CO_2$, rate was measured at 70° F., 1 atmosphere.
[3] Outlet pressure was 250 psig.

TABLE III

MEDIUM BRINE (5%)

| Run No. | AOS Surfactant Carbon No. | Conc. wt % | Feed Rate, ml/min. Surfac. | Oil[1] | Gas[2] | Foam Quality | $\Delta P^3$, psi | $R_2$ calc |
|---|---|---|---|---|---|---|---|---|
| 1 | $C_{12}$ | 0.5 | 2.3 | 0 | 200 | 80 | 70 | — |
|  |  |  | 2.2 | 0.6 | 168 | 80 | 56 | 1.25 |
| 2 | $C_{12}/C_{14}/C_{16} = 3.5/5.5/1$ | 0.5 | 2.3 | 0 | 199 | 80 | 71 | — |
|  |  |  | 2.2 | 0.6 | 167 | 80 | 54 | 1.31 |
| 3 | $C_{10}/C_{12}/C_{14} = 8/1/1$ | 0.5 | 1.5 | 0 | 212 | 87 | 82 | — |
|  |  |  | 1.5 | 0.5 | 212 | 87 | 44 | 1.86 |
| 4 | $C_{10}/C_{12} = 4/1$ | 0.5 | 1.5 | 0 | 218 | 87 | 82 | — |
|  |  |  | 1.5 | 0.5 | 218 | 87 | 18 | 4.56 |
| 5 | $C_{12}$ | 0.5 | 1.5 | 0 | 212 | 87 | 80 | — |
|  |  |  | 1.5 | 0.5 | 212 | 87 | 54 | 1.48 |

[1] The crude oil for these runs was from the Sacroc Oil Field, Scurry Co., Texas.
[2] Gas was $CO_2$, rate was measured at 70° F., 1 atmosphere.
[3] Outlet pressure was 250-300 psig.

From Table I it will be readily understood that higher resistance to foam breaking is obtained in a formation containing a brine having a high (15%) salt content when the alpha olefin sulfonate has on average about 10 carbon atoms, as compared to those containing 8 or 12 carbon atoms. Runs 1 and 2, for example, show that in the presence of such high salt content brine, AOS which on average contains 10 carbons atoms, $R_2$ approaches 1. Where the AOS contains on average 12 carbons atoms, as in Run 3, $R_2$ approaches a value of 2. And where the AOS is a mixture containing 50% 8 and 10 carbon atoms, as in Run 5, $R_2$ is greater than 1.5. Mixtures of AOS as in Runs 6 and 7 containing 10, 12 and 14 carbon atoms, or as in Run 4 containing 10 and 12 carbon atoms tend to cause $R_2$ to vary in accordance with the relative amount of $C_{10}$.

With brines of low salt content (3%) shown in Table II where the AOS has a carbon content from about 12 to 16 carbon atoms the foam is most resistant to oil breaking through the foam as compared to 10 carbon atoms as in Run 1.

In brines of medium salt content (5%), shown in Table III an average carbon content of 12 atoms in the surfactant is preferred, as in Runs 1, 2 and 5 as compared to Runs 3 and 4 where $C_{12}$ represented only 10% and 20%, respectively, and $C_{10}$ representing 80% in both of the Runs.

While only a few examples of the present invention have been disclosed in detail, various modifications and changes in the composition and the method of forming foams to enhance miscible gas recovery of petroleum will occur to those skilled in the art. As noted above, the specific examples using AOS of differing molecular weights include only even numbers of carbon atoms, such as alpha olefins produced by the Ziegler process. However, alpha olefins produced by steam cracking of wax having both odd and even numbers of carbon atoms may also be used with equal effectiveness in practice of the present invention. Accordingly, all such modifications and changes coming within the scope of the appended claims are intended to be included therein.

I claim:

1. A method of enhancing recovery of petroleum from an oil bearing formation during injection of a non-condensible gas having at least partial miscibility in the oil which comprises at least periodically injecting a preformed foam composition formed of alpha olefin sulfonate (AOS) and brine or water, into said oil bearing formation, said pre-formed foam being a mixture of said gas, brine or water and an effective foam forming amount of an AOS, said AOS having from 8 to 24 carbon atoms, the number of carbon atoms being selected in accordance with the salt content of brine in said formation so that at higher salt concentrations said AOS has on average less than about 12 carbon atoms and at lower salt concentrations said AOS has on average at least about 12 carbon atoms.

2. The method of claim 1 wherein said non-condensible gas includes $CO_2$, $N_2$, $CH_4$ and mixtures thereof.

3. The method of claim 1 wherein the salt content of said brine in said formation is at least about 10 percent by weight and said AOS having on average about ten carbon atoms.

4. The method of claim 3 wherein said effective foam forming amount of said AOS in said foam is at least 0.1% by weight.

5. The method of claim 1 wherein the said content of said brine in said formation is not greater than about two percent by weight and said AOS having on average about fourteen carbon atoms.

6. The method of claim 5 wherein said effective foam forming amount of said AOS in said foam is at least 0.1% by weight.

7. The method of claim 1 wherein the salt content of said brine in said formation is from about two percent to about ten percent by weight and said AOS has on average about twelve carbon atoms.

8. The method of claim 7 wherein said effective foam forming amount of said AOS in said foam is at least 0.1% by weight.

9. The method of claim 1 wherein said foam is preformed by combining said non-condensible gas, said brine, and said AOS, and said foam is introduced into said formation through the gas injection well tubing so that said foam is stabilized before introduction into said formation.

10. The method of claim 9 wherein said foam is formed before introduction into said gas injection well tubing.

11. The method of claim 9 wherein said foam is formed in said gas injection well tubing.

12. The method of claim 1 wherein said foam is preformed by simultaneously injecting said AOS dissolved in said brine and said gas through the gas injection well tubing and then selectively pumping said foam and said injection gas into said formation.

13. The method of claim 12 wherein said foam is formed before introduction into said gas injection well tubing.

14. The method of claim 12 wherein said foam is formed in said gas injection well tubing.

15. The method of claim 1 wherein the liquid volume fraction of said preformed foam does not exceed about fifty percent.

16. The method of claim 15 wherein the liquid volume fraction of said preformed foam is between five percent and fifty percent.

17. The method of claim 16 wherein said liquid volume fraction of said preformed foam is between about ten percent and twenty percent.

18. A method of enhancing oil recovery from an oil bearing formation wherein a miscible, non-condensible gas is injected to pressurize fluids and/or increase the mobility of oil in said formation, said method comprising preforming a stable foam from a portion of said miscible gas, a brine having a salt content substantially similar to water in said oil-bearing formation and an effective foam forming amount of alpha olefin sulfonate (AOS), said AOS being compatible with said brine to maintain the stability of said foam in the presence of oil in said formation, and said AOS having from 8 to 24 carbon atoms, the number of carbon atoms being selected in accordance with the salt content of said brine so that at higher salt concentrations said AOS has on average less than about 12 carbon atoms and at lower salt concentrations said AOS has on average at least about 12 carbon atoms, injecting through at least one well bore penetrating said formation a sufficient volume of said preformed stable foam to maintain a substantially continuous bank of said stable foam between said miscible gas and the permeability channels for gas, oil and water through said formation, and injecting said gas into said formation to drive said foam into said permeability channels to enhance recovery of oil from the less permeable portions of said formation through at least one producing well penetrating said formation.

19. The method of claim 18 wherein said alpha olefin sulfonate of said foam is selected so that in a brine having a salt content in excess of about ten percent by weight said alpha olefin sulfonate has on average about 10 carbon atoms and in a brine having a salt content of not over about two percent by weight said alpha olefin sulfonate has on average about 14 carbon atoms.

20. The method of claim 19 wherein said alpha olefin sulfonate is selected to have on average about 12 carbon atoms in brines having salt concentrations of from two percent to ten percent by weight.

* * * * *